US012808667B2

(12) United States Patent
Reimann et al.

(10) Patent No.: US 12,808,667 B2
(45) Date of Patent: Nov. 24, 2026

(54) MOTION-BASED CONTROL FOR A SURVEYING SYSTEM

(71) Applicant: HEXAGON INNOVATION HUB GMBH, Heerbrugg (CH)

(72) Inventors: Bernd Reimann, Heerbrugg (CH); Nicholas Bade, Widnau (CH); Sybille Verena Komposch, Feldkirch (AT); Elias Niel, Dornbirn (AT); Philipp Lukas Rüst, Herisau (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 852 days.

(21) Appl. No.: 18/078,624

(22) Filed: Dec. 9, 2022

(65) Prior Publication Data

US 2023/0184551 A1 Jun. 15, 2023

(30) Foreign Application Priority Data

Dec. 9, 2021 (EP) .................................... 21213394

(51) Int. Cl.
*G01C 15/06* (2006.01)
*G01C 1/04* (2006.01)
(Continued)

(52) U.S. Cl.
CPC ............... *G01C 15/06* (2013.01); *G01C 1/04* (2013.01); *G01C 11/04* (2013.01); *G01C 15/00* (2013.01);
(Continued)

(58) Field of Classification Search
None
See application file for complete search history.

(56) References Cited

U.S. PATENT DOCUMENTS 5,229,828 A * 7/1993 Wiklund ................. G01S 17/42 356/4.01
6,628,308 B1 * 9/2003 Greenberg ............ G06F 3/0481 715/764
(Continued)

FOREIGN PATENT DOCUMENTS

CN 104736963 A 6/2015
CN 112525169 A 3/2021
(Continued)

OTHER PUBLICATIONS

Extended European Search Report dated Jun. 2, 2022 as received in Application No. 21213394.6.

*Primary Examiner* — Arleen M Vazquez
*Assistant Examiner* — Leonard S Liang
(74) *Attorney, Agent, or Firm* — Maschoff Brennan

(57) ABSTRACT

A surveying system for measuring the position of a measuring point, the surveying system including a survey pole with a pointer tip for contacting the measuring point, and position giving means for making available the coordinative determination of a referenced position, the position giving means being placed on the body with a defined spatial relationship relative to the tip, a control and evaluation unit for deriving the position of the measuring point at least based on the determined referenced position and on the defined spatial relationship of the position giving means relative to the tip, and an inertial measurement unit comprising IMU sensors, a motion tracker configured to derive motions and/or motion patterns of the survey pole, wherein, if a derived motion or motion pattern corresponds to a defined motion pattern, the surveying system is configured to automatically perform an action associated with the defined motion pattern.

16 Claims, 5 Drawing Sheets

(51) Int. Cl.
*G01C 11/04* (2006.01)
*G01C 15/00* (2006.01)
*G01C 21/16* (2006.01)
*G01S 19/47* (2010.01)

(52) U.S. Cl.
CPC ......... *G01C 15/002* (2013.01); *G01C 21/166* (2020.08); *G01S 19/47* (2013.01)

(56) References Cited

U.S. PATENT DOCUMENTS 7,062,305 B1 * 6/2006 Cameron ............... G01C 15/06 342/357.29
9,541,392 B2 1/2017 Dusha
10,234,827 B2 3/2019 Clarkson et al.
10,969,494 B2 4/2021 Kipka
2003/0114984 A1 * 6/2003 Scherzinger ........... G01C 15/00 701/472
2003/0226941 A1 * 12/2003 Crain .................... F16B 7/1463 248/176.1
2008/0046221 A1 * 2/2008 Stathis ................. G01C 15/002 703/1
2008/0154538 A1 * 6/2008 Stathis .................. G01S 13/878 702/152
2011/0043515 A1 * 2/2011 Stathis ................. G01C 15/002 434/118
2012/0010847 A1 * 1/2012 Hamel ................... G01C 15/06 702/150
2015/0009067 A1 * 1/2015 Rudow ................... G01S 19/43 342/357.51
2015/0268045 A1 * 9/2015 Dusha .................. G01C 21/188 33/228
2017/0067739 A1 * 3/2017 Siercks .................. H04N 23/55
2018/0100931 A1 * 4/2018 Kipka ..................... G06F 16/29
2019/0094388 A1 * 3/2019 Görcke .................. G01C 19/34
2020/0166338 A1 * 5/2020 Parés Calaf ........... G01C 15/06
2020/0348133 A1 * 11/2020 Eisenreich ........... G01C 15/004
2021/0063150 A1 * 3/2021 Malkoc .................. G01C 15/00
2021/0190969 A1 * 6/2021 Best ........................ G01S 19/42
2022/0090910 A1 * 3/2022 Müller ................. G01C 15/002
2022/0187069 A1 * 6/2022 Bernhard ............. G01C 15/002
2023/0098762 A1 * 3/2023 Kikuchi ................... G01C 1/02 345/156

FOREIGN PATENT DOCUMENTS

EP 3 198 303 A1 8/2017
EP 3 306 347 A1 4/2018
EP 2 909 579 B1 5/2019

* cited by examiner

MOTION-BASED CONTROL FOR A SURVEYING SYSTEM

BACKGROUND

The present disclosure pertains to a surveying system for measuring the position of a point using a survey pole and to a computer-implemented method for controlling such a surveying system. Particularly, the disclosure pertains to a surveying system comprising a pole equipped with an inertial measurement unit (IMU), wherein data from the IMU is used to derive motion patterns of the pole and wherein the surveying system automatically performs actions or workflows associated with the derived motion pattern.

A motion state can be a special case of a motion pattern. For instance, in a case in which the pole rests in a certain position over a certain period of time, so that the IMU detects no or basically no movements during this period of time, this lack of movements and the period of time without movements can be regarded as a motion state as a special case of a motion pattern.

In many geodetic applications, points are surveyed by positioning specially configured target objects at them. These target objects usually comprise a pole having a targetable marking, reflector or prism for defining the measurement distance or the measuring point. Using a geodetic surveying apparatus, such as a total station, a relatively large number of such target objects can be surveyed. In other geodetic applications, the pole comprises a GNSS antenna—i.e. either in addition to a reflective target or as an alternative.

Modern total stations have microprocessors for digital post-processing and storage of acquired measurement data. These devices are generally produced in a compact and integrated design, usually with coaxial distance and angle measurement elements as well as calculation, control and storage units integrated in one device. Often, means for motorizing the target optics, for reflectorless distance measurement, for automatic target search and tracking and for remote control of the entire apparatus are integrated. Total stations known from the prior art furthermore have a radio data interface for setting up a radio link to external peripheral components, for example to a data acquisition apparatus which, in particular, may be formed as a hand-held data logger, remote control unit, array processor, notebook, small computer or PDA. By means of the data interface, measurement data acquired and stored by the total station can be output to external post-processing, and externally acquired measurement data can be read into the total station for storage and/or post-processing. Also, remote control signals for remote control of the total station or of another external component, particularly in mobile field use, can be input or output, and control software can be transferred into the total station.

During regular operation of a survey pole—independent of whether the pole comprises a GNSS antenna or is operated together with a surveying device, the operator at some time needs to put the pole aside, e.g. have the pole rest against a wall or similar object in the surrounding or against his own shoulder, or drop the pole to the ground. This need arises whenever the operator needs to have both hands available, e.g. while using a handheld device or for marking a previously measured point on the ground.

In order to reduce energy consumption, it would be desirable if during this time, some or all components of the pole or the surveying system, e.g. a GNSS antenna or a total station, could be switched off or turned into a sleep mode automatically, and would be switched on again automatically if the operator resumes the surveying operation.

While the pole is put aside, a surveying instrument tracking the pole might lose its sight at the pole's reflective target. Fast and automatic re-locking of the pole's reflective target by a total station after line of sight has been lost is a known problem. Conventionally, total stations may simply extrapolate the last known movement if line of sight is lost for up to five seconds and then wait for one second at this position. It would be desirable, in order to reduce energy consumption of the surveying instrument, if a search for the reflective target would only be performed when the operator resumes the surveying operation. Also, it would be desirable to improve the speed of resuming the surveying operation, by quickly relocking to the reflective target automatically when the pole is moved back to its operating position.

Surveying systems, in which a survey pole comprises or is equipped with an IMU, are generally disclosed, for instance, in EP 2 909 579 B1 and U.S. Pat. No. 10,234,827 B2.

SUMMARY

It would thus be desirable, if motions, motion patterns and/or motion states of the pole would be detectable in real time and could be used to automatically trigger certain actions or workflows of the surveying system.

It is therefore an object of the present disclosure to provide an improved surveying system comprising a survey pole.

It is another object of the present disclosure to provide such a surveying system that is easier to operate. It is a particular object to provide such a surveying system which can be operated by performing certain movements with the pole, particularly by repeating a pre-defined motion pattern.

It is another object of the present disclosure to provide such a surveying system that has a reduced energy consumption. It is a particular object to provide such a surveying system which can be automatically powered-down while the pole is not used.

It is another object of the present disclosure to provide such a surveying system which operates faster. It is a particular object to provide such a surveying system which automatically resumes measurements after a break.

At least one of these objects is achieved by the surveying system as described herein and/or the method as described.

A first aspect pertains to a surveying system for measuring the position of a measuring point. The surveying system comprises:

- a survey pole with a body having a pointer tip for contacting the measuring point, and position giving means for making available the coordinative determination of a referenced position, the position giving means being placed on the body with a defined spatial relationship relative to the tip,
- a control and evaluation unit for deriving the position of the measuring point at least based on the determined referenced position and on the defined spatial relationship of the position giving means relative to the tip, and
- an inertial measurement unit (IMU) comprising IMU sensors including accelerometers and/or gyroscopes, and being configured to continuously generate IMU data related to a rotational rate and/or acceleration of the pole.

According to this aspect, the system comprises a motion tracker configured to receive the IMU data and to derive, based on the IMU data and in real time, motions and/or motion patterns—including motion states—of the survey pole, wherein, if a derived motion or motion pattern corresponds to a defined (e.g. pre- or user-defined) motion pattern (or motion state) of the survey pole, the surveying system is configured to automatically perform an action associated with the defined motion pattern.

The position giving means of the survey pole for instance may comprise a retroreflector, e.g. in the form of a prism, and/or a GNSS antenna.

According to one embodiment of the surveying system, the motion tracker is configured to generate motion data regarding derived motions or motion patterns and to provide the motion data to the control and evaluation unit, wherein the control and evaluation unit is configured to determine, based on the motion data, whether a derived motion or motion pattern corresponds to one of a plurality of defined motion patterns, and to issue a command to perform the action associated with the determined defined motion pattern to a unit or device of the surveying system, the action associated with the determined defined motion pattern relating to a function of said unit or device.

According to one embodiment, a database of the surveying system comprises a plurality of different defined motion patterns of the survey pole (e.g. either pre-defined or user-defined motion patterns), each defined motion pattern being associated with an action of the surveying system, particularly wherein the control and evaluation has access to the database.

In one embodiment, the control and evaluation unit comprises the database.

According to another embodiment of the surveying system, at least one defined motion pattern is a user-defined motion pattern, and the action associated with said user-defined motion pattern is a user-defined workflow of the surveying system.

In one embodiment, upon selection by a user, the system is configured to run, a definition process, and the control and evaluation unit is configured to determine, based on motion data received during the definition process, the user-defined motion pattern and to associate the determined user-defined motion pattern to the user-selected workflow.

According to another embodiment of the surveying system, the position giving means comprise a retroreflector, e.g. a prism, and the surveying system comprises a surveying device, e.g. a total station or a tachymeter, that is configured to measure positional parameters of the retroreflector comprising angles and a distance to the retroreflector and to derive a referenced position of the retroreflector.

In one embodiment, the survey pole and said surveying device are configured to establish a remote data connection with each other, and the action associated with the determined defined motion pattern relates to a function of the surveying device.

In one embodiment,

- the motion tracker is configured to generate motion data regarding derived motions or motion patterns and to provide the motion data to the control and evaluation unit,
- the control and evaluation unit is configured to determine, based on the motion data, whether a determined motion corresponds to one of the defined motion patterns, and configured to issue a command to perform the action associated with this defined motion pattern to the surveying device, and
- the control and evaluation unit is configured to receive the motion data via the remote data connection or to issue the command to the surveying device via the remote data connection.

According to another embodiment of the surveying system, the position giving means comprise a GNSS antenna, and the surveying system comprises a GNSS processing unit configured to process output signals of the GNSS antenna and to derive a referenced position, orientation and/or velocity of the GNSS antenna based on the output signals.

In one embodiment, the action associated with the determined defined motion pattern relates to a function of the GNSS antenna and/or the GNSS-processing unit, wherein the motion tracker is configured to generate motion data regarding derived motions or motion patterns and to provide the motion data to the control and evaluation unit, and the control and evaluation unit is configured to determine, based on the motion data, whether a determined motion pattern corresponds to one of the defined motion patterns, and configured to issue a command to perform the action associated with the detected defined motion patterns to the GNSS antenna and/or the GNSS-processing unit, respectively.

According to another embodiment of the surveying system, the motion tracker is configured to determine at least inertial velocity data as part of the motion data. For instance, the motion tracker may be further configured to determine

- inertial attitude data and inertial position data as part of the motion data,
- a velocity as part of the motion data, and/or
- a yaw angle, a pitch angle and a roll angle of the survey pole as part of the motion data.

According to another embodiment, the system is configured to establish a data connection with a remote server computer and to provide IMU data and/or motion data to the remote server computer, the motion data being generated by the motion tracker.

In one embodiment, pre-defined motion patterns stored at the remote server computer, and the system is configured

- to detect typical user behaviour from the IMU data and/or from the motion data,
- to send corresponding IMU data and/or motion data to the remote server computer, wherein the sent data is dedicated to update pre-defined motion patterns stored at the remote server computer, and
- to receive updated pre-defined motion patterns from the remote server computer.

According to another embodiment of the surveying system, the motion tracker uses a machine-learning based algorithm for identifying motions and/or motion patterns, for instance including a Kalman filter.

According to another embodiment of the surveying system, the motion tracker is provided at the survey pole (e.g. integrated in or attached to it) and comprises the inertial measurement unit.

According to another embodiment of the surveying system, the IMU is integrated in the pole or attached to the pole. For instance, the inertial measurement unit may be integrated in the body of the pole or be part of a mobile device, wherein the pole comprises a receptacle for accepting the mobile device. For instance, the inertial measurement unit may be designed as a micro-electro-mechanical system and/or comprise at least three accelerometers in a mutually orthogonal configuration and at least three gyroscopes in a mutually orthogonal configuration.

According to some embodiments of the surveying system, the pre-defined motion patterns comprise a depositing motion pattern of the survey pole, in which the survey pole is moved from an upright position in a recumbent or reclined position.

In one embodiment, deriving motions and/or motion patterns comprises deriving the upright position of the survey pole and at least one of the recumbent or reclined position of the survey pole or a movement of the survey pole from the upright position to the recumbent or reclined position.

In another embodiment, the survey pole remains motionless or basically motionless in the recumbent or reclined position for at least a pre-defined time, e.g. at least five seconds.

In another embodiment, the action associated with the depositing motion pattern comprises switching off a GNSS unit of the survey pole and/or stopping tracking of a retroreflector of the survey pole by a surveying device of the surveying system.

According to some embodiments of the surveying system, the pre-defined motion patterns comprise a pick-up motion pattern of the survey pole, in which the survey pole is moved from a recumbent or reclined position in an upright position.

In one embodiment, deriving motions and/or motion patterns comprises deriving the recumbent or reclined position of the survey pole and at least one of the upright position of the survey pole or a movement of the survey pole from the recumbent or reclined position to the upright position.

In another embodiment, the survey pole remains motionless or basically motionless in the recumbent or reclined position for at least a pre-defined time, e.g. at least five seconds.

In another embodiment, the action associated with the pick-up motion pattern comprises switching on a GNSS antenna of the survey pole and/or performing a search by a surveying device of the surveying system for a retroreflector of the survey pole.

According to another embodiment, the pointer tip is configured for providing a punch or centre-punch functionality for physically marking a point on an object, e.g. for marking the measuring point. For this purpose, the pointer tip comprises a spring that is configured and arranged so that it is compressed when the pointer tip is pushed onto the point of the object and released when a predefined amount of compression has been reached. In this case, the defined motion patterns comprise a punch-motion pattern, in which the survey pole is pushed with the pointer tip onto a point of the object and the spring is released. In one embodiment, the action associated with the punch-motion pattern comprises performing a measurement for deriving the position of the marked point, e.g. the measuring point.

A second aspect pertains to a computer-implemented method for controlling a surveying system, such as the surveying system according to the first aspect. The surveying system comprises:

- a survey pole with a body having a pointer tip for contacting a measuring point, and position giving means for making available the coordinative determination of a referenced position, the position giving means being placed on the body with a defined spatial relationship relative to the tip, the position giving means for instance comprising a retroreflector or a GNSS antenna,
- a control and evaluation unit for deriving a position of a measuring point at least based on the determined referenced position and on the defined spatial relationship of the position giving means relative to the tip, and
- an IMU, being provided on the survey pole, comprising IMU sensors including accelerometers and gyroscopes, and being configured to continuously generate IMU data.

According to this aspect, the method comprises

- deriving, based on the continuously generated IMU data and in real time, motions and/or motion patterns of the survey pole, e.g. using a machine-learning algorithm,
- determining whether a derived motion or motion pattern corresponds to one of a plurality of defined motion patterns, an action for at least one unit or device of the surveying system being associated with each pre-defined motion pattern, and
- issuing a command to perform the action associated with the determined defined motion pattern to the respective unit or device of the surveying system.

A third aspect pertains to a computer programme product comprising programme code which is stored on a machine-readable medium, or being embodied by an electromagnetic wave comprising a programme code segment, and having computer-executable instructions for performing, when executed in a surveying system, e.g. in a surveying system according to the first aspect, the method according to the second aspect.

BRIEF DESCRIPTION OF THE DRAWINGS

Aspects will be described in detail by referring to exemplary embodiments that are accompanied by figures, in which.

DETAILED DESCRIPTION

Figure 1A:
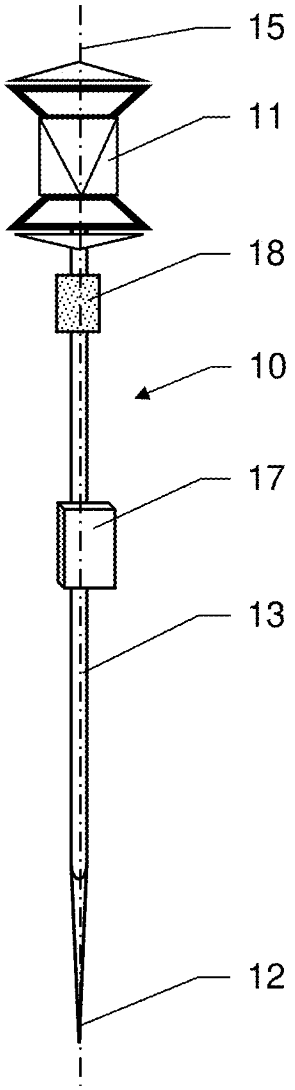
FIGS. 1*a*-*b* show two embodiments of a survey pole as part of a surveying system, the pole comprising either a retro-reflector or a GNSS antenna as position giving means.
Figure 1B:
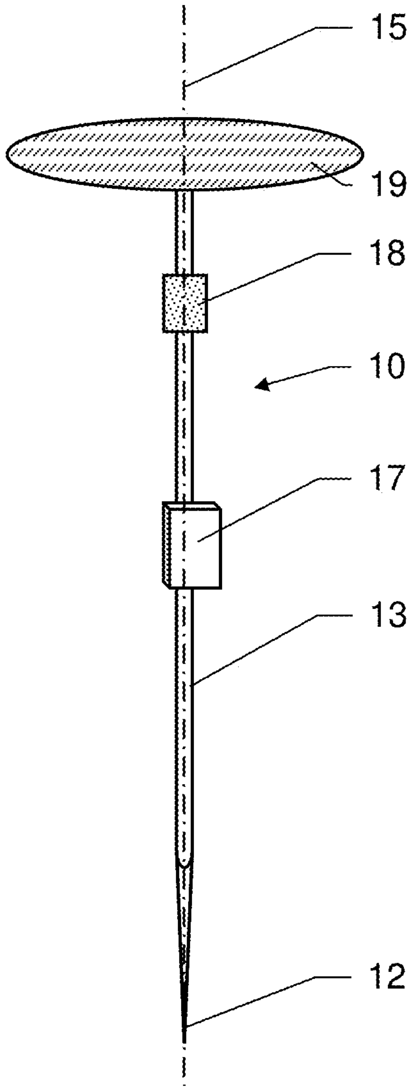

FIGS. 1*a* and 1*b* show a survey pole 10 as part of a surveying system. The survey pole 10 has a rigid, rod-shaped body 13 with a pointer tip 12 for contacting a measuring point on the ground or on an object, e.g. on a wall or ceiling. The body 13 defines a pole axis 15.

FIG. 1*a* shows a first embodiment, in which the pole 10 comprises retro-reflector means 11, e.g. a prism, as position giving means for making available the coordinative determination of a referenced position, the retro-reflector means 11 being positioned on the body 13 at a known position relative to the tip 12. The system also comprises determination means for repeatedly determining the referenced position of the position giving means.

FIG. 1*b* shows a second embodiment of the survey pole 10, in which the pole comprises a GNSS receiver 19 as position giving means for making available the coordinative determination of a referenced position, the GNSS receiver 19 being positioned on the body 13 at a known position relative to the tip 12. The GNSS receiver 19 optionally may be embodied for use with real-time kinematic positioning (RTK), precise point positioning (PPP) or differential GNSS (DGNSS). The system also comprises determination means for repeatedly determining the referenced position of the position giving means.

In both shown embodiments, the survey pole 10 comprises an inertial measurement unit (IMU) 18 placed on the body 13 with a defined spatial relationship relative to the position giving means, wherein the IMU 18 is designed in form of a micro-electro-mechanical system and comprises IMU-sensors including accelerometers and gyroscopes. The pole 10 comprises an evaluation unit 17 for deriving the position of the measuring point 1 at least based on the determined referenced position and on the defined spatial relationship of the position giving means relative to the tip 12.

The shown IMU 18 comprises three accelerometers in a mutually orthogonal configuration, i.e. in a configuration such that their measuring axes are orthogonal to each other, and three gyroscopes in a mutually orthogonal configuration, i.e. in a configuration such that their measuring axes are orthogonal to each other. Other possible setups that deliver high accuracies, special energy saving modes or higher update rates could include additional accelerometer and/or gyroscopes, e.g. with axes aligned in parallel to the before mentioned ones. Optionally, also a magnetometer may be included.

Although the IMU 18 in FIGS. 1*a* and 1*b* is depicted as an external feature of the pole 10, obviously it can also be integrated into the body 13. Alternatively, it can be part of the GNSS receiver 19 or be provided as a separate unit that is attachable to the body 13 or any other part of the pole 10. For instance, the pole 10 may comprise a receptacle for holding the IMU 18 or a mobile device comprising the IMU 18 during operation, such a device could be a smartphone, a field controller or a similar mobile device. Also, the IMU 18 could be provided by other means without being fixedly attached to the pole, as long as it provides IMU data of the pole 10 during operation. For instance, the IMU 18 may be integrated into smart gloves (or similar wearables) worn by the operator 3 holding the pole 10, so that they are loosely attached only during operation. Such gloves may indicate whether the pole is being held or not and the IMU data is interpreted as IMU data of the pole 10 only while it is being held.

Moreover, the evaluation unit 17, which are depicted in FIGS. 1*a* and 1*b* as an external feature of the pole 10, can also be part of the IMU 18 or the GNSS receiver 19, or integrated into the body 13. Alternatively, the evaluation unit 17 may be provided in a surveying device of the system (e.g. the total station 20 of FIG. 2) or may be part of a mobile device, such as a field controller, an accessory of the system or a mobile phone having the necessary software (app) installed.

Optionally, pointer tips may be provided at both ends of the pole 10, so that the retro-reflector means 11 or the GNSS receiver 19 are provided between the two tips (not shown here). Optionally, a pointer tip of the pole 10 may be configured to provide a punch or centre-punch functionality for marking of measuring points (not shown here).

Figure 2:
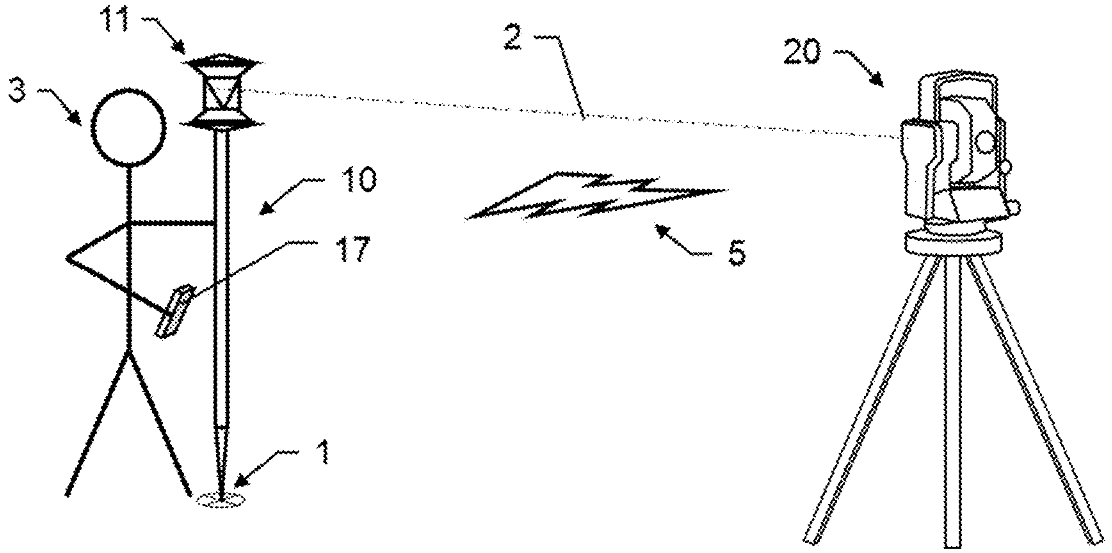
FIG. 2 shows an exemplary embodiment of a surveying system, the surveying system comprising a survey pole and a total station.

FIG. 2 shows an exemplary embodiment of a surveying system comprising a survey pole 10 and a surveying device 20 embodied as a total station. The survey pole 10 comprises a retroreflector 11 and an inertial measurement unit (not shown here) as described with respect to FIG. 1*a*. The evaluation unit 17 in this example is configured as a mobile device which is hand-held by a human operator 3 (e.g. surveyor) of the pole 10.

The surveying device is referenced to a reference coordinate system and configured to measure a distance 2 and relative angles to the retroreflector 11 of the pole 10, so that a referenced position of the retroreflector 11 and, thus, the measuring point 1 can be derived.

In some embodiments, a remote data connection 5 between the surveying device 20 and the pole 10 or the control device 17 may be established, e.g. for providing measuring data to the operator 3 or for allowing remote control of the surveying device 20.

Figure 3A:
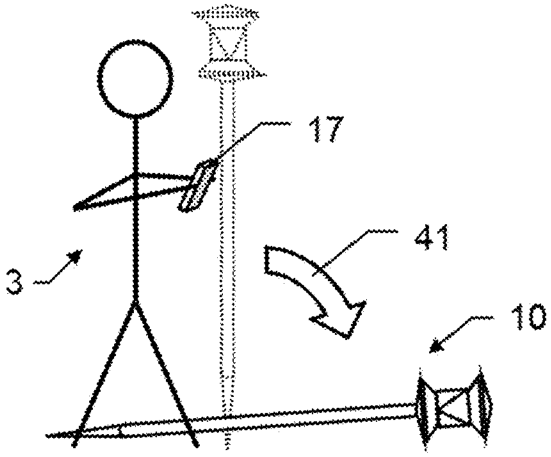
FIGS. 3*a*-*b* illustrates a putting aside of the survey pole during a surveying operation with a first and second example of a detectable motion.
Figure 3B:
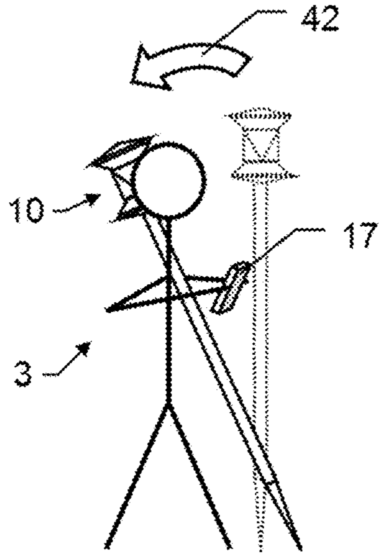

Often, as illustrated in FIGS. 3*a* and 3*b*, during regular operation of a survey pole 10, the operator 3 will put the pole 10 aside eventually. In this case, the pole 10 might rest against a wall or similar object in the surrounding or against the shoulder of the operator 3. Also, the operator 3 might put or drop the pole 10 to the ground. This is part of the regular workflow whenever the operator 3 needs to have both hands available, e.g. while using the evaluation unit 17 attached to the pole 10 as a mobile device or for marking a previously measured point on the ground.

In FIG. 3*a*, the operator 3 of the system of FIG. 2 has put down the pole 10 to the ground. In FIG. 3*b*, the pole 10 rests on the operator's shoulder. These events can be detected, e.g. with the help of machine learning, so that further events can be triggered.

In some embodiments, the resting itself can be detected. For instance, detecting that the pole 10 rests statically against a wall or shoulder of the operator as shown in FIG. 3*b* allows to update the IMU bias estimate in a sensor fusion algorithm, e.g. comprising a Kalman filter, running on the pole, e.g. a zero-velocity potential update (ZUPT). If the pole rests motionless or basically motionless for a defined time, based on the IMU data, the pole is detected as not being in use, i.e. as being inactive. The defined time may be pre-defined, e.g. five seconds, or selectable by a user, e.g. from a range of 3 to 30 seconds.

Alternatively or additionally, the movements 41, 42 from the operating position to the resting positions on the ground and at the shoulder could be detected as motion patterns. For instance, such a movement 41, 42 and consequent lack of movement for the defined time can be detected based on the IMU data and interpreted as inactivity of the pole 10. As illustrated in FIGS. 3*a* and 3*b*, inactivity of the pole could include resting, standstill and laying positions. However, the operator 3 walking between two measuring points 1, thereby carrying the pole 10 could also be detected based on the IMU data and optionally interpreted as inactivity of the pole 10.

A detected inactivity of the pole 10 could be used to trigger an energy saving mode on the device. For instance, tilt compensation could be temporarily deactivated, or for a pole with GNSS, energy saving would disable real-time kinematic (RTK). Since processing RTK and/or tilt compensation requires a significant amount of processing power, it significantly consumes energy from the battery. A low-power motion state detection model that detects non-usage of the pole 10 or detects that the surveyor 3 moves between different measuring points, e.g. with a resolution of over 1 Hz, allows for a timely triggered energy saving. Preferably, in order to allow an effective energy saving, the continuously running low-power motion state detection consumes as few energy as possible. At the very least, it should consume significantly less energy than the units that can be powered down.

Figure 4:
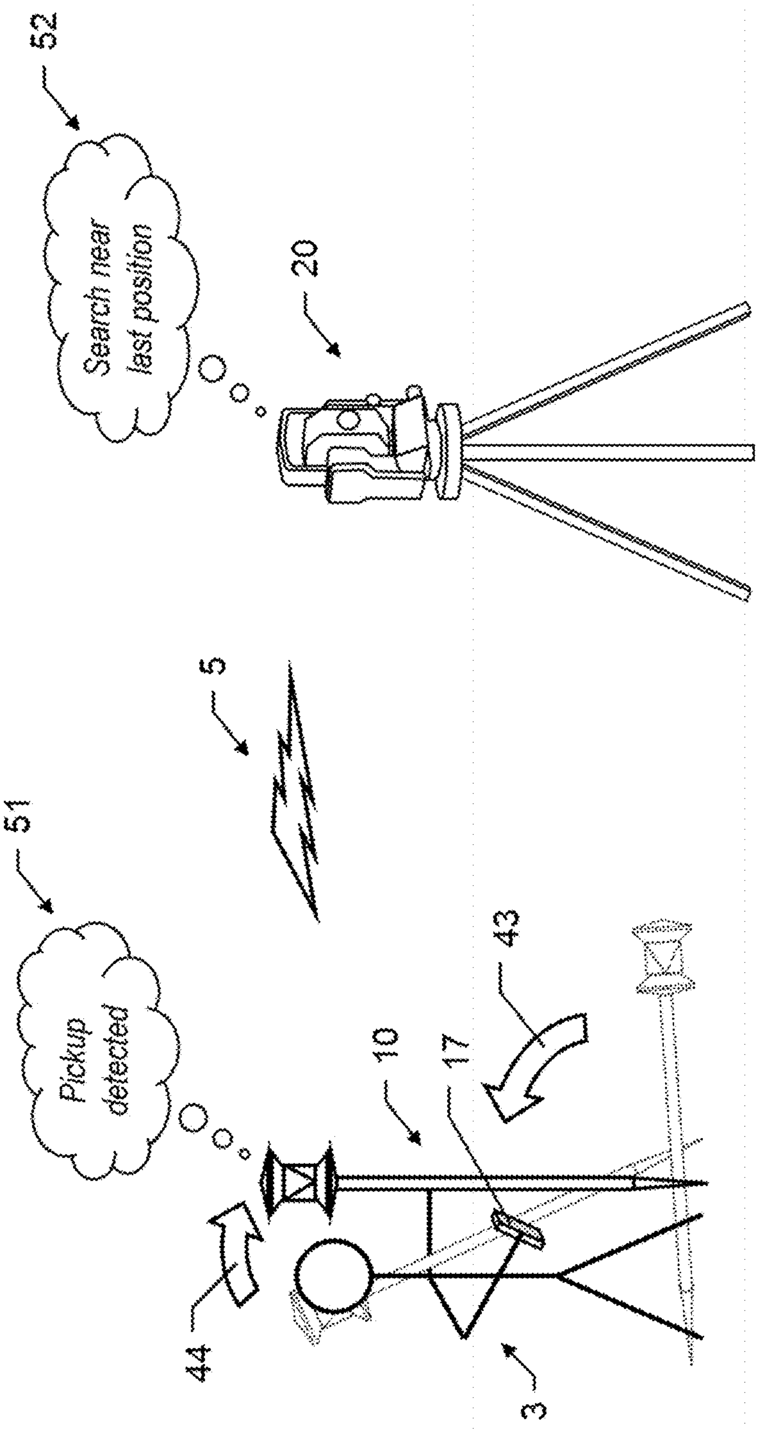
FIG. 4 illustrates automatically resuming the surveying operation after the survey pole is brought back into the operation position with a third and fourth example of a detectable motion that is associated with an action.

FIG. 4 illustrates a situation in which the operator 3 of the surveying system has finished his use of the mobile device 17 (or other break) and now resumes the surveying by moving the pole 10 back into the operating position, i.e. by a picking-up movement 43 or by a repositioning movement 44.

In the shown example, at the pole 10 a movement pattern 51 is detected in the picking-up movement 43 or by a repositioning movement 44 of the pole 10 from its resting position, e.g. laying on the ground where it is out of sight of the surveying device 20. This detected movement pattern 51 (e.g. on combination with the previously detected inactivity) is used for triggering a faster re-lock of the pole 10 by sending a command to the surveying device 20 via the remote data connection 5 to perform a certain action or workflow 52, e.g. a command to perform a search for the pole's reflective target near the last position or near a predicted position (e.g. predicted by means of dead reckoning).

Conventionally, when the line of sight between the prism 11 attached to the pole and the surveying device 20 is lost, the surveying device 20 will perform a search to find the pole 10, e.g. it will start rotating around the horizontal axis and/or the vertical axis searching for a prism 11. However, if the pole 10 is determined to be resting stationary (i.e. being inactive), this power search may be called off and delayed until the pole 10 is determined to be picked up again. If then a pre-defined pick-up motion 51 is detected, a command can be sent to the total station 20 to search near the last known position of the pole 10, narrowing down the search space drastically and, therefore, increasing re-lock speed significantly.

Figure 5:
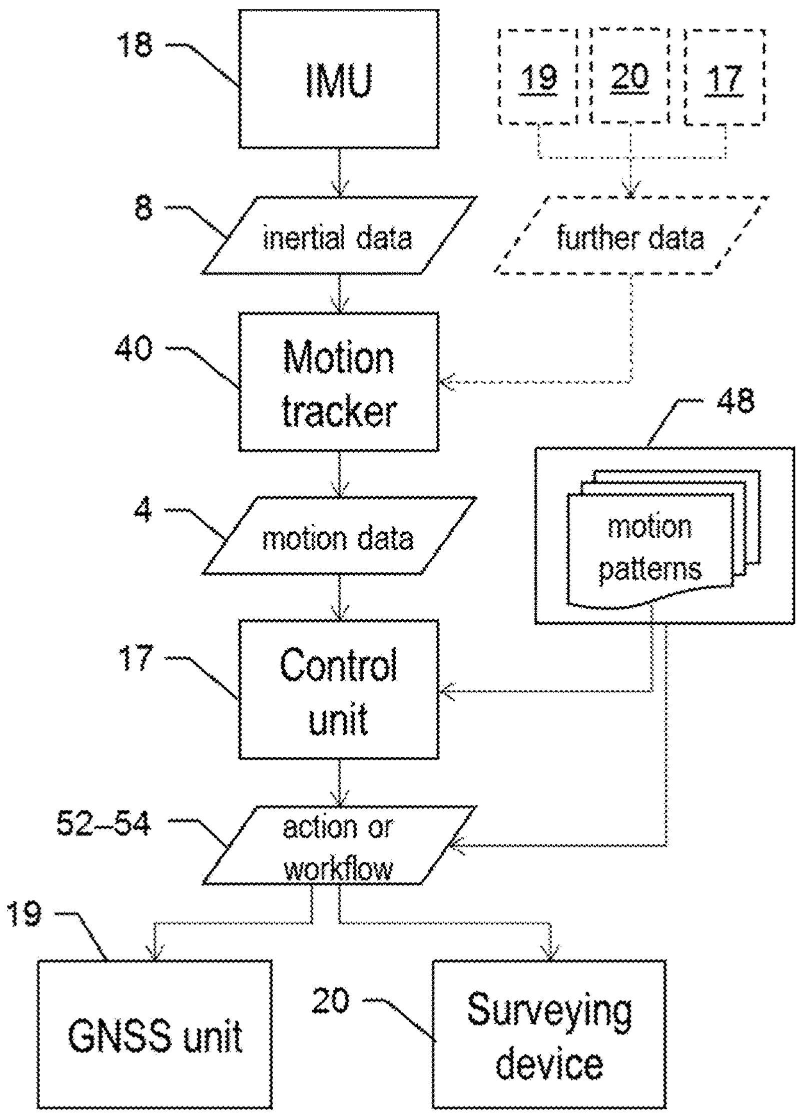
FIG. 5 illustrates data flow in an exemplary embodiment of a surveying system.

FIG. 5 illustrates the flow of data in an exemplary embodiment of a surveying system. The IMU 18 of the pole comprises inertial measurement sensors including accelerometers and gyroscopes and is configured to continuously generate inertial data 8 (IMU data). For instance, the IMU 18 comprises at least three accelerometers and at least three gyroscopes, both in mutually orthogonal configurations. Optionally, the IMU 18 can also be designed as a micro-electro-mechanical system.

The inertial data 8 is provided to a motion tracker 40, i.e. a unit or device comprising a motion tracker algorithm. In some embodiments, the IMU 18 and the motion tracker 40 can be embodied as one unit that is provided at the pole. For instance, a field controller attached to the pole may comprise the IMU 18 and a motion tracker algorithm. The motion tracker 40 receives the inertial data 8 and derives, based thereon, actual motions and/or motion patterns of the survey pole.

A control unit, which may be embodied as a control and evaluation unit 17, has access to a database 48 which comprises a plurality of different pre-defined motion patterns of the survey pole, wherein each of the pre-defined motion patterns is associated with an action or workflow of the surveying system, or, more precisely, for one or more units or devices of the surveying system. Database 48 need not necessarily be understood as a database of motion patterns per se, but also can be seen a database of the features corresponding to the motion patterns or rather a database of mathematical functions describing the boundaries between different motion patterns in a projected (non-physical) space.

The motion patterns in the database may also include motion patterns which are used to minimize the error due to pole length, for instance if the target and the IMU are mounted between the pole tip and that part of the pole body that is held by the user, or in case of a pole having tips at both ends. If the pole has more than one pointer tip, e.g. one tip at both ends of the body, the motion patterns may also be used to determine which of the pointer tips is contacting the measurement point.

The motion patterns in the database may include motion patterns connected to inactivity of the pole 10, and the associated action or workflow of the surveying system may comprise powering-down units of the pole 10 or other devices of the surveying system, e.g. a total station. The motion patterns in the database may also include motion patterns connected to a re-activation, i.e. an end of inactivity, of the pole 10, and the associated action or workflow of the surveying system may comprise powering-up units of the pole 10 or other devices of the surveying system again.

The motion patterns in the database may also include motion patterns relevant for an inertial navigation algorithm, particularly if the inertial navigation algorithm is using the same IMU data. Practical examples may include zero velocity updates (no movement detected), upper/lower boundary (human step counting), or tuning of algorithm parameters related to motion (walking, running, driving, etc.).

In some embodiments, the motion tracker 40 and the control and evaluation unit 17 can be embodied as one unit, optionally also comprising the IMU 18. The control and evaluation unit 17 is configured to receive the motion data 4 and to determine, based thereon, whether a derived motion or motion pattern corresponds to one of the plurality of pre-defined motion patterns stored in the database 48. If a derived motion or motion pattern is determined to correspond to one of the pre-defined motion patterns, a command to perform the workflow 52-54 associated with this pre-defined motion pattern is sent to the respective unit(s) or device(s) of the surveying system, the workflow associated with the determined pre-defined motion state relating to a function of said unit(s) or device(s). In the shown example, these units and devices comprise a GNSS unit 19 of the pole, e.g. a GNSS antenna and a corresponding GNSS-processing unit, and a surveying device 20, e.g. a total station measuring distances and angles to a prism or similar target of the pole.

Optionally, the motion tracker 40 may receive more data than only the inertial data 8. As shown in FIG. 5 in dashed lines, further data, e.g. provided by the GNSS unit 19, the surveying device 20 or the control and evaluation unit 17, can be provided to the motion tracker 40 and be considered for deriving the actual motions and/or motion patterns of the survey pole. The inertial data 8 and the further data may be used as raw data. Alternatively, a fused state estimation using a sensor fusion algorithm (such as a particle filter or a Kalman filter) of the further data can also contribute to the inertial data 8.

Figure 6:
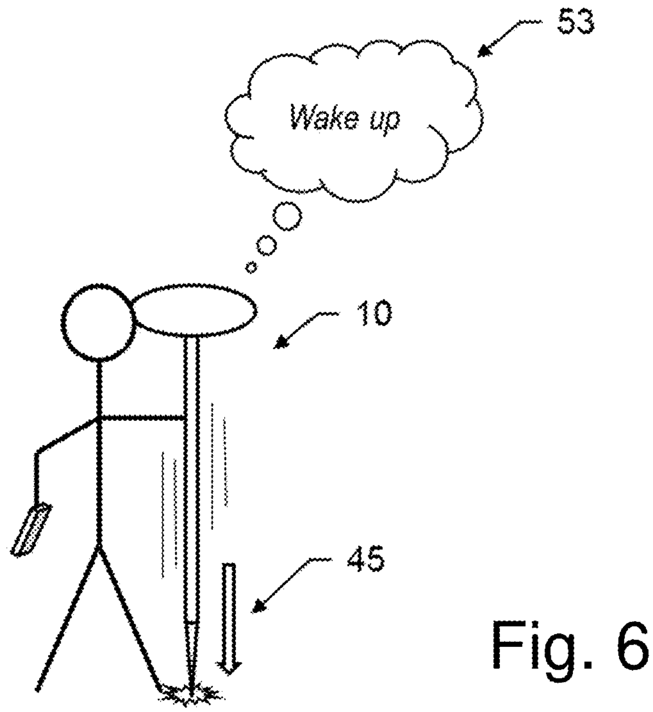
FIG. 6 illustrates a fifth example of a detectable motion that is associated with a first action of a GNSS unit of the pole.

FIG. 6 shows an embodiment of a surveying system, in which a survey pole 10 comprises a GNSS unit with a GNSS antenna 19. The operator performs a motion pattern 45 which consists of a linear motion along the vertical axis of the pole, thereby hitting the ground with the pole's tip, e.g. hitting a measuring point. The IMU detects accelerations induced by these motions and the motion tracker identifies the accelerations as a motion pattern 45. The motion pattern 45 is compared to pre-defined motion patterns and identified as being associated with an action 53 of the GNSS unit, e.g. to wake up from an energy saving sleeping mode.

Optionally, the pointer tip is equipped with additional features having an impact on IMU measurements. An example of such a feature is a punch or centre-punch functionality, wherein the pointer tip comprises a pin, a spring and a mechanical guiding system. Such a functionality as part of a survey pole is known per se. Once the pointer tip having the punch or centre-punch functionality is pushed onto an object, e.g. onto a measuring point on the object, the spring is compressed. At a predefined amount of compression, the spring is immediately released by the mechanical guiding system, which causes the pin (e.g. made from hardened steel) to punch a notch into the object, in order to physically mark a point on the object, e.g. as a measuring point. This sequence of events may be related to a punch-motion pattern which is characteristic for the use of the punch or centre-punch functionality. The IMU detects accelerations, particularly those induced by the released spring, and the motion tracker identifies the accelerations as a motion pattern. Upon detecting this motion pattern, a predefined command is issued. For instance, this command may comprise automatically executing a measurement by the surveying system to determine the position of the physically marked point as the measuring point 1.

Figure 7:
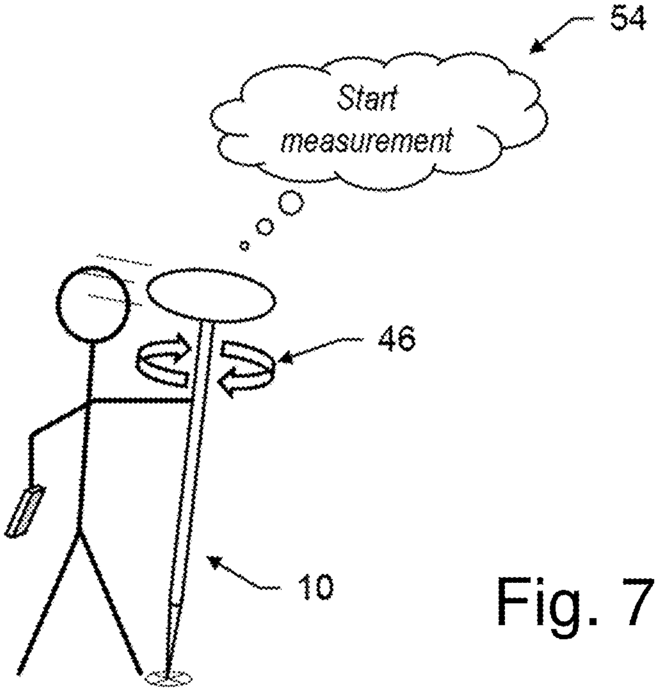
FIG. 7 illustrates a sixth example of a detectable motion that is associated with a second action of a GNSS unit of the pole.

In FIG. 7, in order to indicate that the operator wants to start an automated measurement process, the operator performs a motion pattern 46 which consists of a rotation about the vertical axis while the pole's tip rests on the ground, e.g. on a measuring point. The IMU detects accelerations and rotation rates induced by these motions and the motion tracker identifies the accelerations as a motion pattern 46. The motion pattern 46 is compared to pre-defined motion patterns and identified as being associated with a workflow 54 of the GNSS unit and other units of the pole. A command to perform this workflow 54 is then sent to all involved units. Every workflow 52-54 can be either pre-defined, e.g. provided on the device as pre-installed software, or user-defined, e.g. by adapting a pre-defined workflow or by generating a new workflow.

Preferably, IMU data 8 from a period of more than one second may be used for identifying a motion pattern or motion state, for instance IMU signals from about the last 1.5 seconds or from about the last 2 seconds. A Kalman filter state may be used for determining—using IMU data as well as GNSS data or data derived by the total station—attitude information and optionally also velocity.

One or several machine learning models (ML-models) such as Decision Trees, Random Forests or Support Vector Machines can be trained to classify the current movement into different categories. These models may run on the "edge", i.e. directly at the pole 10 or in another unit or device of the surveying system (e.g. the control unit 17, or the surveying device 20 of FIG. 2). Detecting one of the desired events would in turn trigger the corresponding workflow 52-54 by issuing the corresponding commands.

When an ML-model is used, the motion patterns 41-46 are recorded and used to train these models. The data is split into at least two datasets: Into a first dataset which will be used to train the model and into a second dataset which will be used to test and evaluate this model and all further models. The resulting model is then stored on device and available to the control unit 17, the database 48 of motion patterns is not needed on device but can be used for further re-training purposes. The motion patterns 41-46 comprise features extracted from the IMU signals, and optionally attitude and velocity information derived by total station, GNSS and/or IMU measurements which might be fused, e.g. in a Kalman filter. These features can be pre-defined statistics computed in the time and/or frequency domain over a signal of e.g. 1.5 seconds or 2 seconds length. These features are then input to a machine learning algorithm and used to classify the input signal into one or several of the predefined motion pattern classes. When a Neural Network is used, the network will learn and extract features on its own.

Using the pre-trained model(s), users can record additional motion patterns and configure workflows that will be triggered once this pattern is recognized on their own. Alternatively, users can re-record data for pre-defined motion patterns to re-train and individualize the models towards their needs. This is done by recording the motion pattern of the user on device and then either re-training offline (i.e. in the cloud or at a computer where the recorded data and a software would be loaded) or on the device directly. In both cases features would be calculated as before, and—using the previously trained ML-models and/or previously recorded motion patterns—a new training process would be triggered. Furthermore, new data recorded would automatically be split into a training and test dataset. The model would be trained using the new and optionally old training data. The new model can then be loaded onto the device. To assure quality of the model and evaluate its performance, automatic tests can be called to verify that the model's performance has not degraded (regression testing) by using recorded motion patterns from the old and new test datasets.

Recording of additional motion patterns could be achieved automatically. For this, user behaviour (e.g. initiating system actions or workflows by conventionally pressing a button) is logged in a specific user action log together with a certain amount of time-wise preceding IMU data in an accompanied IMU data log. The two logs are then sent to a repository where the logs of potentially many different users are evaluated to find typical user behaviour. This repository could be cloud-based or locally at the customer's site. Based on the method mentioned above, the database 48 of motion patterns 41-46 can be updated.

If one or more of the defined motion pattern are user-defined motion patterns, the actions associated with the user-defined motion patterns may include user-defined workflows of the surveying system.

When the definition process is started by a user, e.g. on a GUI of the control unit 17 or similar device, the control and evaluation unit determines the user-defined motion pattern based on motion data received during the definition process and associates this motion pattern to a workflow, e.g. a user-selected or user-defined workflow.

In some embodiments, detecting motion patterns is at least partially user-trainable. For instance, users may define and record motion data for their own motion patterns and pick from a menu which action or workflow to trigger. Alternatively, the user could record data for predefined motions to allow for better adaption or individualization towards the specific user (re-training or transfer learning). Moreover, user data may be gathered to train new models. For instance, the system might detect typical user behaviour and associated motion patterns. Corresponding data is then sent from the system to a central server, e.g. of the manufacturer. Based on this data, the catalog of motion patterns may be updated and distributed to all systems. It is also possible to run an anomaly detector which would only need a history of typical usage data (assumed to be "normal") and would give rise to alerts when observing outliers.

In some embodiments, different motion patterns could be detected that enable different operating modes. For instance, the system may detect and differentiate between low-dynamic ("slow"), rather steady accelerations and movements (e.g. a pole fixed on a vehicle) vs. high-dynamic ("fast"), chaotic accelerations and movements (e.g. a surveyor carrying a pole around). Depending on the detected movement pattern, a different operating mode can be triggered for the GNSS module or total station, e.g. a high precision mode or a high lock-stability mode. Thus, with a modified sampling rate, a higher measurement precision can be achieved for more quiet movements. Or with a field-of-view adaption of the lock-sensor, the stability and robustness to keep the lock on high-dynamic targets can be improved. Furthermore, other sensors can be set to different sampling rates or field of views. Also, different operation modes could be automatically detected by running a classification algorithm on the IMU signal.

The described motions and motion patterns can be recognized either based on rules, using machine learning or using hybrid approaches.

Recognizing motions and motion patterns based on rules (rule-based) includes using a fixed, more or less manually defined set of rules ("conditions") to identify certain states. An example for a rule-based approach is an energy-saving mode. In a specific case, this could comprise standstill detection or inactivity detection to save energy (e.g.: "if movement falls below threshold in 10*s*, then inactive"). These conditions can be defined in a data-driven manner and/or can be partially adjusted by the user (e.g. threshold values). The rules can define simple threshold values, comprise "if-then" conditions or be derived statistically.

Rule-based approaches only allow relatively simple rules and often need manual definitions. Using machine learning (ML), complex patterns or rules can also be recognized and learned. Specifically, a movement phase between two measuring points (i.e. the operator carrying the pole from one measuring point to another) can also be recognized and delimited from the actual measurement. This allows the use of an energy-saving mode even during movements. ML-based algorithms that can be used include decision trees, random forests, SVMs or neural networks. These algorithms can be used both for signal classification and for a detector. During the classification, the last measured values (e.g. two seconds) are used with a defined update frequency (e.g. 2 Hz) and classified by the algorithm. If necessary, a further step "feature extraction" takes place before the algorithm is called. A neural network or other "deep learning" methods learn the features independently; for classic algorithms, defined statistics in the frequency or time domain could be calculated here. Alternatively, the processing of the motion data is carried out in a rolling fashion by continuously processing a continuously generated time series of the motion data.

In the hybrid approach, rule-based approaches are combined with ML models. For example, simple states could be recognized rule-based for energy saving, more complex states using an ML approach. Examples for a hybrid approach comprise a decision tree with relevant situations and ML models running in each case, and, conversely, classification of the processes using ML and then a rule-based approach.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A surveying system for measuring the position of a measuring point, the surveying system comprising a survey pole with a body having a pointer tip for contacting the measuring point, and position giving means for making available the coordinative determination of a referenced position, the position giving means being placed on the body with a defined spatial relationship relative to the tip, wherein the position giving means comprise a retroreflector, a surveying device configured to measure positional parameters of the retroreflector, the positional parameters comprising angles and a distance to the retroreflector, and to derive a referenced position of the retroreflector, wherein the survey pole and the surveying device are configured to establish a remote data connection with each other, a control and evaluation unit for deriving the position of the measuring point at least based on the determined referenced position and on the defined spatial relationship of the position giving means relative to the tip, an inertial measurement unit (IMU) comprising IMU sensors and being configured to continuously generate IMU data related to at least one of a rotational rate and an acceleration of the pole, and a motion tracker provided at the survey pole or in a mobile device attached to the survey pole, the motion tracker being configured to receive the IMU data and to derive, based on the IMU data and in real time, motions or motion patterns of the survey pole, wherein the surveying system is configured, in response to a line of sight between the retroreflector and the surveying device being lost:

to determine, based at least on the motions or motion patterns derived by the motion tracker, a predicted position of the retroreflector, and to transmit, via the remote data connection, a command to the surveying device for causing the surveying device to perform a search for the retroreflector near the predicted position.

2. The surveying system according to claim 1, wherein the motion tracker is configured to generate motion data regarding derived motions or motion patterns and to provide the motion data to the control and evaluation unit, and the control and evaluation unit is configured to determine, based on the motion data, whether a derived motion or motion pattern corresponds to one of a plurality of defined motion patterns, each defined motion pattern being associated with an action of the surveying system, and to issue a command to perform the action associated with the one of the plurality of defined motion patterns to which the derived motion or motion pattern corresponds.

3. The surveying system according to claim 1, comprising a database comprising a plurality of different defined motion patterns of the survey pole, each defined motion pattern being associated with an action of the surveying system.

4. The surveying system according to claim 3, wherein at least one defined motion pattern is a user-defined motion pattern, and the action associated with the user-defined motion pattern is a user-defined workflow of the surveying system, and the system is configured to run, upon selection by a user, a definition process, wherein the control and evaluation unit is configured to determine, based on motion data received during the definition process, the user-defined motion pattern and to associate the determined user-defined motion pattern to the user-selected workflow.

5. The surveying system according to claim 3, wherein the motion tracker is configured to generate motion data regarding derived motions or motion patterns and to provide the motion data to the control and evaluation unit, the control and evaluation unit is configured to determine, based on the motion data, whether a determined motion corresponds to one of the defined motion patterns, and configured to issue a command to perform the action associated with the corresponding defined motion pattern to the surveying device, and the control and evaluation unit is configured to receive the motion data via the remote data connection or to issue the command to the surveying device via the remote data connection.

6. The surveying system according to claim 3, wherein the control and evaluation unit comprises the database or has access to the database.

7. The surveying system according to claim 1, wherein the motion tracker is configured to determine at least inertial velocity data as part of the motion data.

8. The surveying system according to claim 7, wherein the motion tracker is further configured to determine inertial attitude data, inertial position data and a velocity as part of the motion data.

9. The surveying system according to claim 7, wherein the motion tracker is further configured to determine a yaw angle, a pitch angle and a roll angle of the survey pole as part of the motion data.

10. The surveying system according to claim 1, wherein the system is configured to establish a data connection with a remote server computer and to provide data to the remote server computer, to detect typical user behaviour from the provided data and to send corresponding data to the remote server computer, wherein the sent data is dedicated to update pre-defined motion patterns stored at the remote server computer, and to receive updated pre-defined motion patterns from the remote server computer, wherein the provided data and the sent data comprise at least one of IMU data and motion data, the motion data being generated by the motion tracker.

11. The surveying system according to claim 1, wherein the motion tracker uses a machine-learning based algorithm for identifying motions or motion patterns.

12. The surveying system according to claim 1, wherein the IMU is integrated in the body of the pole or part of a mobile device that is attached to the pole, wherein the pole comprises a receptacle for accepting the mobile device.

13. The surveying system according to claim 1, wherein the pointer tip is configured for providing a punch functionality for marking a point of an object, particularly the measuring point, the pointer tip comprising a spring that is configured and arranged so that it is compressed when the pointer tip is pushed onto the point of the object and released when a predefined amount of compression has been reached; and the defined motion patterns comprise a punch-motion pattern, in which the survey pole is pushed with the pointer tip onto a point of the object and the spring is released, wherein the action associated with the punch-motion pattern comprises performing a measurement for deriving the position of the marked point as the measuring point.

14. A computer-implemented method for controlling a surveying system, the surveying system comprising:

a survey pole with a body having a pointer tip for contacting a measuring point, and position giving means for making available the coordinative determination of a referenced position, the position giving means being placed on the body with a defined spatial relationship relative to the tip, wherein the position giving means comprise a retroreflector, a surveying device configured to measure positional parameters of the retroreflector, positional parameters comprising angles and a distance to the retroreflector, and to derive a referenced position of the retroreflector, the survey pole and the surveying device being configured to establish a remote data connection with each other, a control and evaluation unit for deriving a position of a measuring point at least based on the determined referenced position and on the defined spatial relationship of the position giving means relative to the tip, and an inertial measurement unit (IMU), being provided on the survey pole, comprising IMU sensors including accelerometers and gyroscopes, and being configured to continuously generate IMU data related to at least one of a rotational rate and an acceleration of the survey pole, the method comprising deriving, based on the continuously generated IMU data and in real time, motions or motion patterns of the survey pole, detecting that a line of sight between the retroreflector and the surveying device has been lost, determining, in response to the line of sight between the retroreflector and the surveying device being lost and based at least on the derived motions and/or motion patterns of the survey pole, a predicted position of the retroreflector, and transmitting, via the remote data connection, a command to the surveying device for causing the surveying device to perform a search for the retroreflector near the predicted position.

15. A computer programme product comprising program code which is stored on a non-transitory machine-readable medium, and having computer-executable instructions for performing, when executed in a surveying system, the method according to claim 14.

16. A surveying system for measuring the position of a measuring point, the surveying system comprising a survey pole with a body having a pointer tip for contacting the measuring point, and a retroreflector placed on the body with a defined spatial relationship relative to the tip, a surveying device configured to measure positional parameters of the retroreflector, the positional parameters comprising angles and a distance to the retroreflector, and to derive a referenced position of the retroreflector, the survey pole and the surveying device being configured to establish a remote data connection with each other, a control and evaluation unit for deriving the position of the measuring point at least based on the referenced position of the retroreflector and on the defined spatial relationship of the retroreflector relative to the tip, an inertial measurement unit (IMU) provided at the survey pole and comprising IMU sensors and being configured to continuously generate IMU data related to a rotational rate and/or acceleration of the survey pole, and a motion tracker provided in the surveying device and configured to receive, via the remote data connection, the IMU data or motion data derived from the IMU data and to derive, based on the received IMU data or motion data and in real time, motions or motion patterns of the survey pole, wherein the surveying device is configured, in response to a line of sight between the retroreflector and the surveying device being lost, to determine, based at least on the motions or motion patterns derived by the motion tracker, a predicted position of the retroreflector and to perform a search for the retroreflector near the predicted position.

* * * * *